US 8,614,850 B2

(12) United States Patent
Wolfrum et al.

(10) Patent No.: US 8,614,850 B2
(45) Date of Patent: Dec. 24, 2013

(54) METHOD AND APPARATUS FOR GAIN TILT COMPENSATION OVER FIBER OPTIC CABLE

(75) Inventors: Larry Michael Wolfrum, Naperville, IL (US); Julia Y. Larikova, Naperville, IL (US); Richard Cleveland Younce, Yorkville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 208 days.

(21) Appl. No.: 13/188,056

(22) Filed: Jul. 21, 2011

(65) Prior Publication Data

US 2012/0154904 A1 Jun. 21, 2012

Related U.S. Application Data

(60) Provisional application No. 61/424,595, filed on Dec. 17, 2010.

(51) Int. Cl.
*H04B 10/17* (2011.01)
*H04B 10/12* (2011.01)

(52) U.S. Cl.
USPC ............. 359/337.11; 359/341.1; 359/341.4

(58) Field of Classification Search
USPC ............... 359/337.11, 341.1, 341.4
See application file for complete search history.

(56) References Cited

U.S. PATENT DOCUMENTS

| | | | |
|---|---|---|---|
| 5,995,275 A * | 11/1999 | Sugaya | 359/341.3 |
| 6,016,213 A | 1/2000 | Farber et al. | |
| 6,215,581 B1 * | 4/2001 | Yadlowsky | 359/337 |
| 6,483,631 B1 * | 11/2002 | Cheng et al. | 359/337.11 |
| 6,879,437 B2 | 4/2005 | Sandell et al. | |
| 7,009,761 B2 | 3/2006 | Tian et al. | |
| 7,046,429 B2 * | 5/2006 | Halevi et al. | 359/337.1 |
| 7,443,576 B2 | 10/2008 | Eiselt | |
| 2004/0196532 A1 | 10/2004 | Evangelides, Jr. et al. | |
| 2005/0248833 A1 | 11/2005 | Fourte et al. | |

\* cited by examiner

*Primary Examiner* — Eric Bolda
(74) *Attorney, Agent, or Firm* — Fitzpatrick, Cella, Harper & Scinto (57) ABSTRACT

An embodiment of the invention comprises determining a gain tilt based on power measurements from a power measurement block, determining a noise figure penalty based on the gain tilt, determining a gain tilt compensation to compensate for the gain tilt taking into account the noise figure penalty, and communicating the gain tilt compensation to an amplifier block to apply the gain tilt compensation to subsequently received wavelengths.

24 Claims, 6 Drawing Sheets

METHOD AND APPARATUS FOR GAIN TILT COMPENSATION OVER FIBER OPTIC CABLE

RELATED APPLICATION

This application claims benefit of U.S. Provisional Application No. 61/424,595, filed on Dec. 17, 2010, and which is incorporated by reference in its entirety.

BACKGROUND

1. Field

Example aspects described herein relate to optical communication, and more specifically, to a method and system for gain tilt compensation over fiber optic cable.

2. Description of Related Art

Optical networks are used to transmit great amounts of data from one place to another. Ability to use multiple wavelengths in an optical fiber has led to increased data transmission rate. However, a multiplicity of optical signals of different wavelengths transmitted through a series of fiber optic cable spans and optical amplifiers will experience different attenuation and gain as a function of wavelength. This phenomenon of gain tilt, where the shorter wavelengths are typically attenuated the most, ultimately reduces the optical signal-to-noise ratio observed at the transponder terminating a particular wavelength. This reduces the ability of the transponder to decode the received signal without errors. Left uncorrected, the longer wavelengths, after passing through a number of spans and amplifiers, can reach power levels that cause the amplifiers to operate in a non-linear fashion. This also degrades the signal quality observed at the terminating transponder, potentially increasing the received error rate. The signal distortion introduced by gain tilt limits the overall length of a fiber optic span before amplification is required and also limits the number of fiber optic span segments that can be cascaded in a fiber optic network.

However, altering the gain distribution for an optical amplifier may cause the optical amplifier to operate in a non-optimal mode and may increase the overall noise introduced by the amplifier. This increased noise can reduce the optical signal-to-noise ratio such that the signal quality is degraded more than if no gain tilt compensation was applied.

SUMMARY

Existing limitations associated with the foregoing, and other limitations can be overcome by procedures, apparatuses, computer programs, and networks according to example aspects described herein.

In one example embodiment herein, a procedure is provided for determining a gain tilt of signals received by an amplifier device. A gain tilt compensation may then be determined to compensate for the gain tilt, and a tilt compensation impact as a function of the gain tilt compensation may also be determined. A noise figure penalty may then be determined based on the gain tilt. The gain tilt compensation may be adjusted if the noise figure penalty is greater than the tilt compensation impact, and the gain tilt compensation may then be applied to signals subsequently received by the amplifier device.

An embodiment of the invention may also comprise a network element that includes an amplifier block configured to amplify one or more received wavelengths, a power measurement block configured to provide power measurement for each of the received wavelengths amplified by the amplifier block, and a controller block configured to communicate control and status signals with the amplifier block and the power measurement block. The controller block may be configured to determine a gain tilt based on the power measurements from the power measurement block, to determine a noise figure penalty based on the gain tilt, to determine a gain tilt compensation to compensate for the gain tilt taking into account the noise figure penalty, and to communicate the gain tilt compensation to the amplifier block to be applied to subsequently received wavelengths.

An embodiment of the invention may further comprise a method for compensating for gain tilt by determining a gain tilt compensation to be applied based on measured power for one or more wavelengths, determining noise introduced due to gain tilt compensation, prior to applying the gain tilt compensation, and adjusting the gain tilt compensation based on the determined noise introduced.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

A description of example embodiments of the invention follows. In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Various embodiments of the invention are described that compensate for gain tilt introduced over fiber optic cable in telecommunications networks without introducing an additional noise penalty. In calculating the gain tilt compensation to be applied to an optical amplifier, the amount of additional noise introduced by this compensation is taken into consideration. The actual gain tilt compensation applied to the amplifier is chosen to maximize the benefit of the gain tilt compensation while not increasing the optical signal-to-noise ratio.

Figure 1:
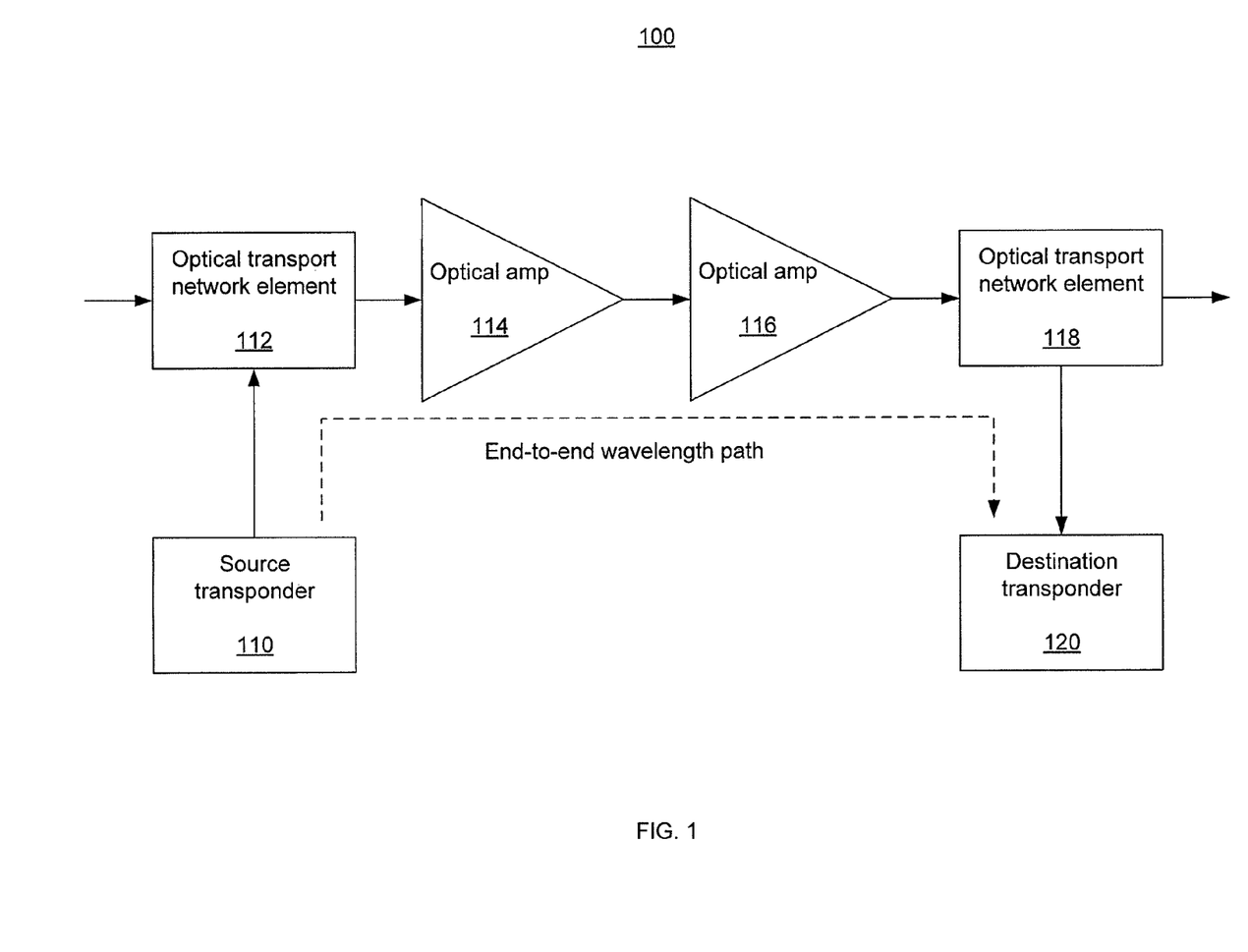
FIG. 1 illustrates an exemplary optical transport network that may be used in accordance with an embodiment of the invention.

Various embodiments of the present invention are described with respect to FIGS. 1 to 5b. FIG. 1 illustrates an exemplary optical transport network that may be used in accordance with an embodiment of the invention. Referring to FIG. 1, there is shown an exemplary optical transport network 100 comprising a source transponder element 110, optical transport network elements 112 and 118, optical amplifier elements 114 and 116, and a destination transponder element 120.

The source transponder element 110 generates an optical signal of a particular wavelength. This signal is added to other optical signals, each of a different wavelength, in the main transmission path of the optical transport network element 112. The combined optical signals are transmitted via optical fiber cables. The optical signals are attenuated as they travel through the optical fiber cables. Accordingly, optical amplifiers such as, for example, the optical amplifier elements 114 and 116 are used to amplify the attenuated optical signals. In this manner, the optical signals transmitted by the optical transport network element 112 may be received by the destination optical transport network element 118, which routes appropriate optical signals to the destination transponder 120.

The optical amplifier elements 114 and 116 receive as input one or more optical signals, each at a different wavelength. Associated with the optical amplifier element 114 or 116 is a power measurement module (not shown in FIG. 1) that is able to measure the power level of each of the wavelengths. The optical amplifier element 114 and/or 116 may provide a variable gain amplification that provides a common gain to all wavelengths. The optical amplifier element 114 and/or 116 may also be able to be controlled to adjust the gain tilt of the wavelengths. The controlling function associated with the optical amplifier element 114 and/or 116 periodically samples the power levels of each wavelength and adjusts the amplifier gain to achieve a nominal output power level across the set of measured wavelengths. One strategy may be to adjust the gain such that the median wavelength power is set to a target output level with the assumption that the power levels of the other wavelengths will not deviate significantly from that of the median. During the amplifier control cycle the gain tilt control algorithm is invoked to further adjust the wavelength power levels at the output of the amplifier.

Figure 2:
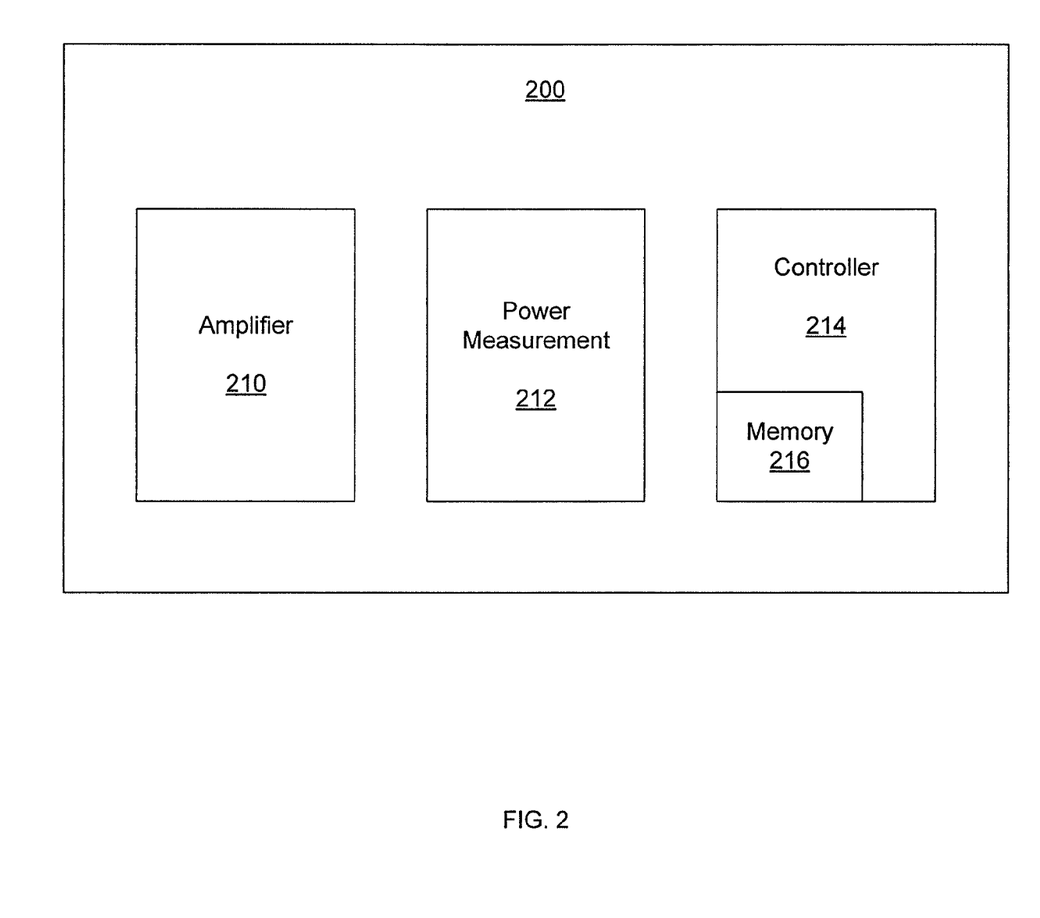
FIG. 2 illustrates an exemplary amplifier element in an optical transport network that may be used in accordance with an embodiment of the invention.

FIG. 2 illustrates an exemplary amplifier element in an optical transport network that may be used in accordance with an embodiment of the invention. Referring to FIG. 2, there is shown an optical amplifier element 200 comprising amplifier block 210, a power measurement block 212, and a controller block 214. The optical amplifier element 200 may be similar to the optical amplifier elements 114 and 116. The amplifier block 210 may be enabled to receive optical signals and amplify the optical signals, and output the amplified optical signals. The amplifier block 210 may be a variable gain amplifier. The power measurement block 212 may enable measurement of power levels for individual optical wavelength signals. The measurement may be, for example, of the output signals of the amplifier block 210 to observe the overall effect of the optical cables and the amplifier block 210. However, various embodiments of the invention may also comprise measuring input signals to the amplifier block 210 in addition to or in place of the measurement of the output signals of the amplifier block 210. The specific measurements may be design and/or implementation dependent.

The controller block 214 may comprise suitable circuitry that may enable specifying power measurement by the power measurement block 212 and controlling the amplifier block 210 as to overall gain and/or gain tilt compensation, as well as miscellaneous processing related to monitoring and controlling the amplifier block 210. Accordingly, the controller block 214 may have access to memory block 216 where code and data may be stored. While the memory block 216 may be shown as part of the controller block 214, the invention need not be so limited. For example, the memory block may be external to the controller block 214. Additionally, part of the functionality of the controller block 214 may also entail communicating with other controller blocks in other network elements or central offices.

The optical amplifier element 200 may be enabled to receive optical signals and amplify the optical signals, and output the amplified optical signals. The optical amplifier element 200 may amplify signals within a specific wavelength spectrum. The specific gain for the amplifier block 210 may be set by control signals or command from, for example, the controller block 214. The controller block 214 may also be used to provide gain tilt compensation. For example, if it is determined that received signals have a gain tilt of 1 dB from the lowest frequency to the highest frequency in the supported wavelength spectrum, the controller block 214 may be used to provide a gain tilt amplification of 1 dB. Although a specific gain tilt amplification may be specific to a design of an optical amplifier, one possible method for providing a gain tilt amplification of 1 dB may be to provide 0 dB gain at the lowest supported frequency while linearly increasing gain to 1 dB at the highest supported frequency.

The power measurement block 212 may be used to measure output power of the amplifier block 210. This may be done, for example, to determine power levels of the various signals to determine whether the gain tilt amplification may have achieved the desired result of substantially the same power levels for all supported wavelengths. The result of the power measurement block 212 may be used, for example, to further tune the gain tilt amplification.

Figure 3:
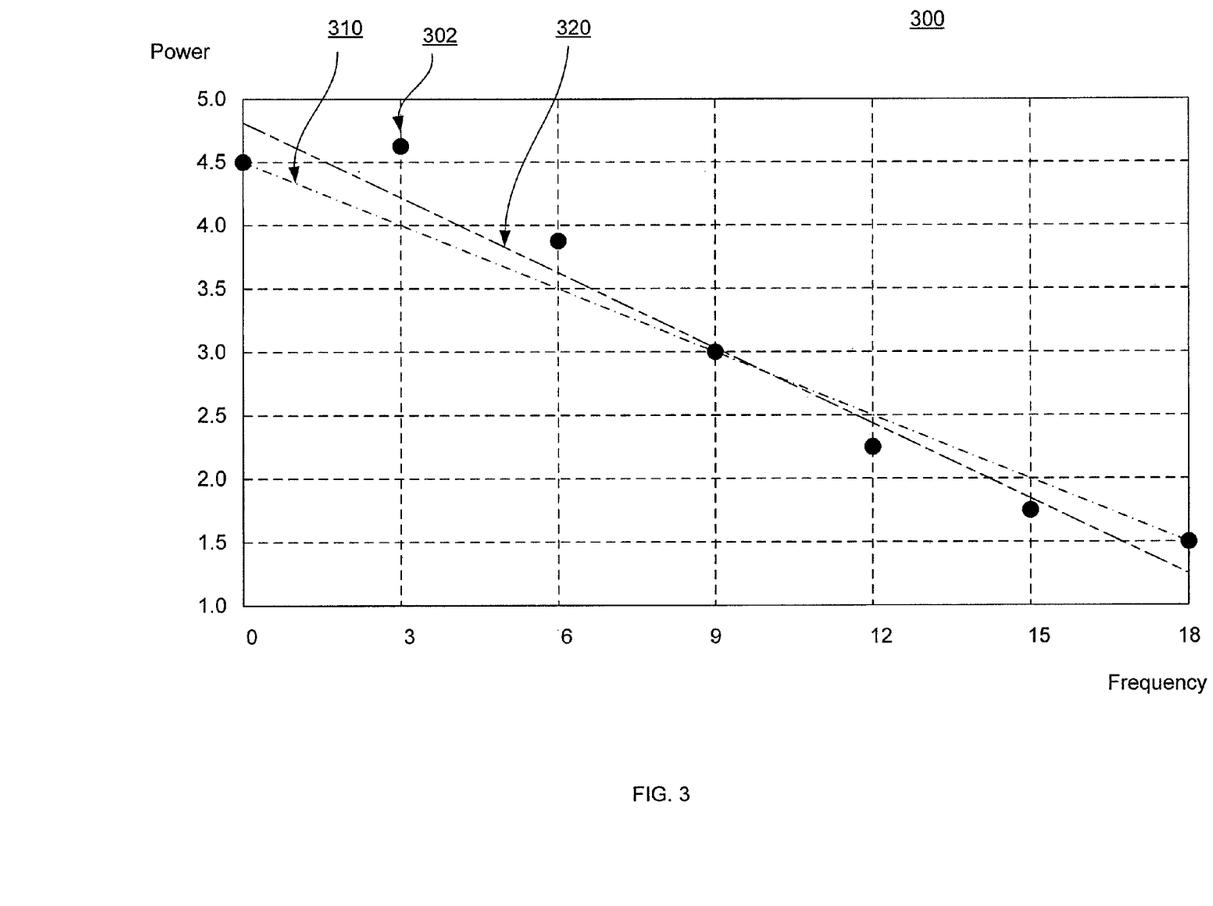
FIG. 3 is a graph illustrating gain tilt slope approximation.

FIG. 3 is a graph illustrating gain tilt slope approximation. Referring to FIG. 3, there is shown a graph 300 with a plurality of data points 302. With respect to the graph 300, increasing Y value indicates higher power level, and increasing X value indicates higher frequency. The data points 302 may indicate a power level at a specific frequency, and accordingly the graph 300 may indicate a gain tilt of the overall received signals. However, generally the data points 302 do not lend themselves to an exact fit for a linear equation.

One measure of gain tilt may be the absolute difference in power between the shortest and longest wavelength available channels, as shown by line 310. Another measure of gain tilt may be defined as the difference in power calculated based on a linear fit function (power level vs. wavelength) between the shortest and longest wavelength available channels, as shown by line 320. The specific measurement of gain tilt is design and/or implementation dependent.

Figure 4:
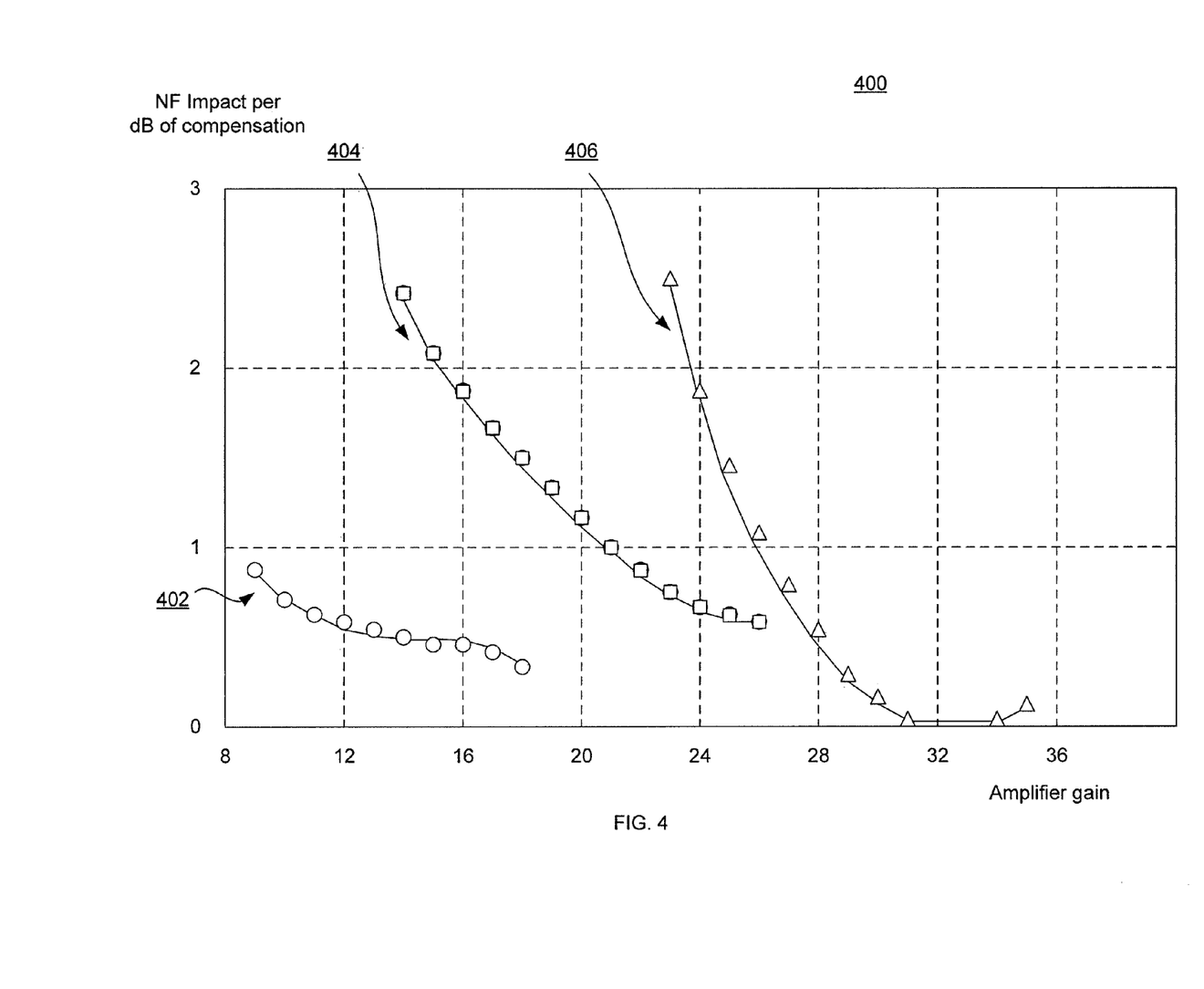
FIG. 4 illustrates noise figure impact in relation to amplifier gain for exemplary optical amplifiers.

FIG. 4 illustrates noise figure impact in relation to amplifier gain for exemplary optical amplifiers. Referring to FIG. 4, the various gain-noise figure impact curves 402, 404, and 406 describe amplifier gain levels versus noise introduced by various types of amplifiers for gain tilt compensation. One of the gain-noise figure impact curves 402, 404, or 406 may describe, for example, the amplifier block 210. The X-axis is the amplifier gain, and the Y-axis is the noise figure impact per dB of gain tilt compensation. A specific amplifier with different gain capability is used depending on the distance that optical signals may be driven.

The gain-noise figure impact curve 402 is for an amplifier design where the amplifier gain may vary from approximately 9 dB to approximately 18 dB. This type of amplifier may have a noise figure of approximately 0.25 to approximately 1 dB per dB of gain tilt compensation depending on overall gain. The gain-noise figure impact curve 404 is for an amplifier design where the amplifier gain may vary from approximately 14 dB to approximately 26 dB. This type of amplifier may have a noise figure of approximately 0.5 to approximately 2.5 dB per dB of gain tilt compensation depending on overall gain. The gain-noise figure impact curve 406 is for an amplifier design where the amplifier gain may vary from approximately 23 dB to approximately 35 dB. This type of amplifier may have a noise figure of up to approximately 2.5 dB per dB of gain tilt compensation depending on overall gain. It may be noted that the gain-noise figure impact curves 402, 404, and 406 indicate that generally there is a higher noise figure impact at lower gain levels than at higher gain levels.

The noise figure impact on the Y-axis and the amplifier gain on the X-axis may be stored, for example, in a table. Alternatively, an equation may be used to determine the noise figure impact given a gain X. The equation may be provided by the manufacturer of the amplifier or an equation may be generated that approximates the gain-noise figure impact curves 402, 404, or 406.

For example, given the gain-noise figure impact curves 402, 404, and 406, the following equations may be used to describe the noise figure impact curves:

$$NFI_{402} = -0.0027X^3 + 0.1181X^2 - 1.718X + 8.63 \quad \text{[Equation 1]}$$

$$NFI_{404} = -0.0036X^2 - 0.2212X + 3.561 \quad \text{[Equation 2]}$$

$$NFI_{406} = 0.014X^2 - 0.91X + 14.72 \quad \text{[Equation 3]}$$

An embodiment of the invention can be used to try to alleviate gain tilt regardless of how the gain tilt is measured. Various embodiments of the invention may take into account one or more of the following guidelines:

1. Do not compensate for any tilt if the overall gain is less than a certain level, with this level determined by the amplifier noise characteristics.
2. Do not compensate for less than a minimum amount of tilt, with this amount determined by amplifier noise characteristics. Compensating for less than this minimum will produce the largest noise figure degradation and should be avoided.
3. Do not compensate for the full tilt if estimated noise figure penalty from tilt compensation is larger than the penalty from not compensating for the tilt. Instead, compensate for as much as the noise figure impact will allow.

While these general rules of thumb have been stated, the invention need not be so limited. For example, different amplifier elements with other characteristics not available at the present time may be introduced. Various embodiments of the invention may then take those characteristics into account in determining gain tilt compensation.

An example of calculating noise figure is given here using an amplifier with the gain-noise figure impact curve 406. A gain tilt is calculated to be 2 dB, and a power gain of 23 dB is desired without including the gain tilt compensation. One definition of noise figure penalty due to the gain tilt may be the gain tilt divided by two. Accordingly, the noise figure penalty is 1 dB in this example. Using Equation 3 where the variable X is equal to 23, the $NFI_{406}$ is calculated to be 1.2. Multiplying the $NFI_{406}$ by 2 db (the gain tilt) gives a tilt compensation impact of 2.4 dB.

Since the noise figure penalty of 1 dB is less than the tilt compensation impact of 2.4 dB, a gain tilt compensation may not be performed for the full 2 dB gain tilt. However, by reducing the gain tilt compensation to apply to 0.8 dB of gain tilt rather than the full 2 dB of gain tilt, it may be seen that the tilt compensation impact is equal to the noise figure penalty. Accordingly, a gain tilt compensation may be applied for a portion of the full gain tilt without adding additional noise. Therefore, while the optical signal to noise ratio may not be improved, there is an overall optical signal amplification due to a partial compensation for gain tilt without further degradation in signal to noise level.

Various embodiments of the invention may be used to determine the amount of gain tilt compensation to apply based on the measured gain tilt and the amplifier noise characteristics. The magnitude of the expected improvement in optical signal-to-noise ratio due to the gain tilt compensation is compared to the additional noise that will be introduced by the compensation itself. The amount of gain tilt compensation applied is then limited such that the magnitude of this additional noise introduced is less than or equal to the corresponding signal-to-noise ratio improvement derived from the gain tilt compensation. This approach may be used to try to maximize the gain tilt compensation while maintaining, and possibly increasing, the optical signal-to-noise ratio. Maximizing the gain tilt compensation may increase the number of fiber optic span segments that can be cascaded in a fiber optic network.

Figure 5A:
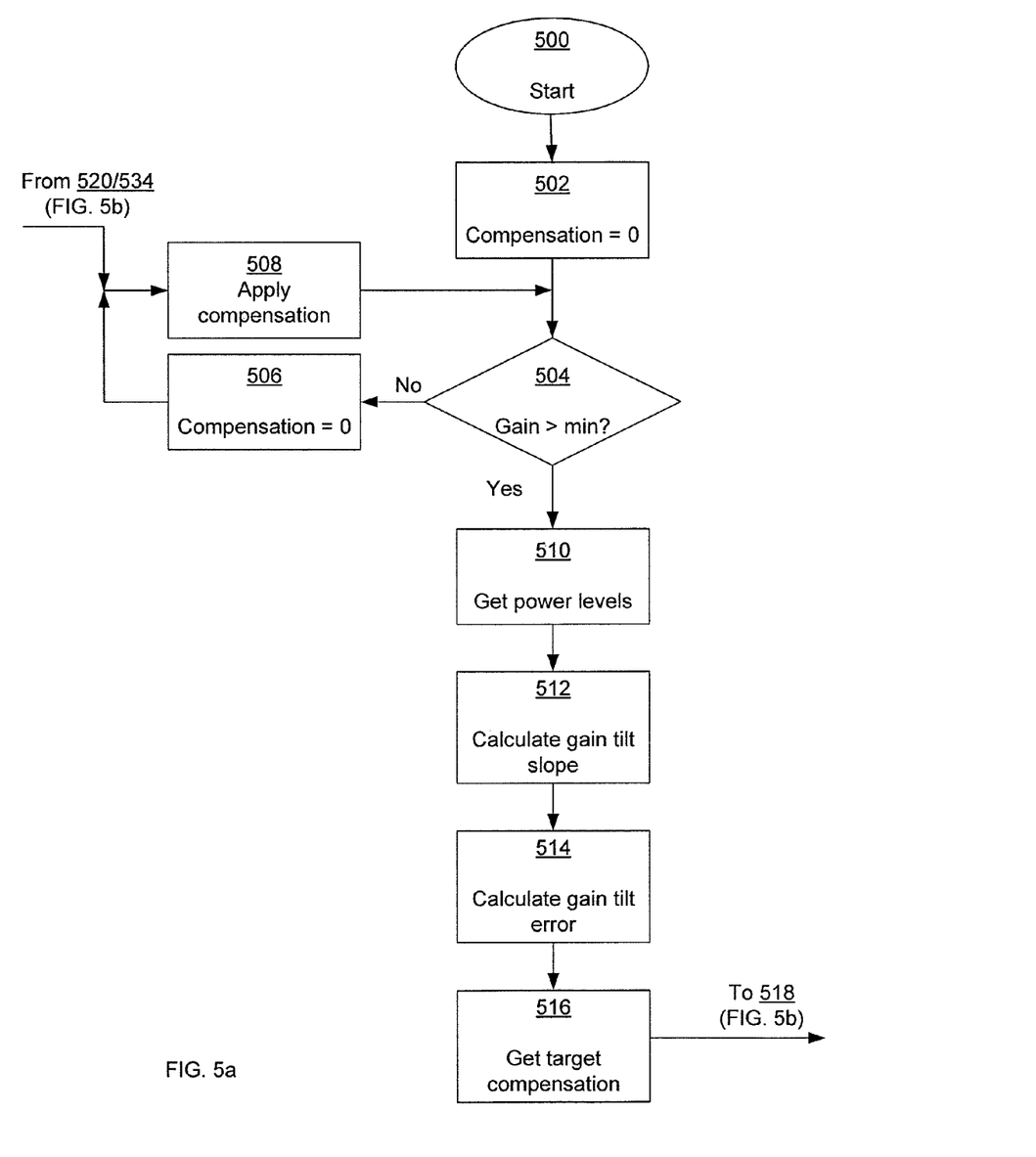
FIG. 5a illustrates an exemplary flow chart for gain tilt compensation in accordance with an embodiment of the invention.
Figure 5B:
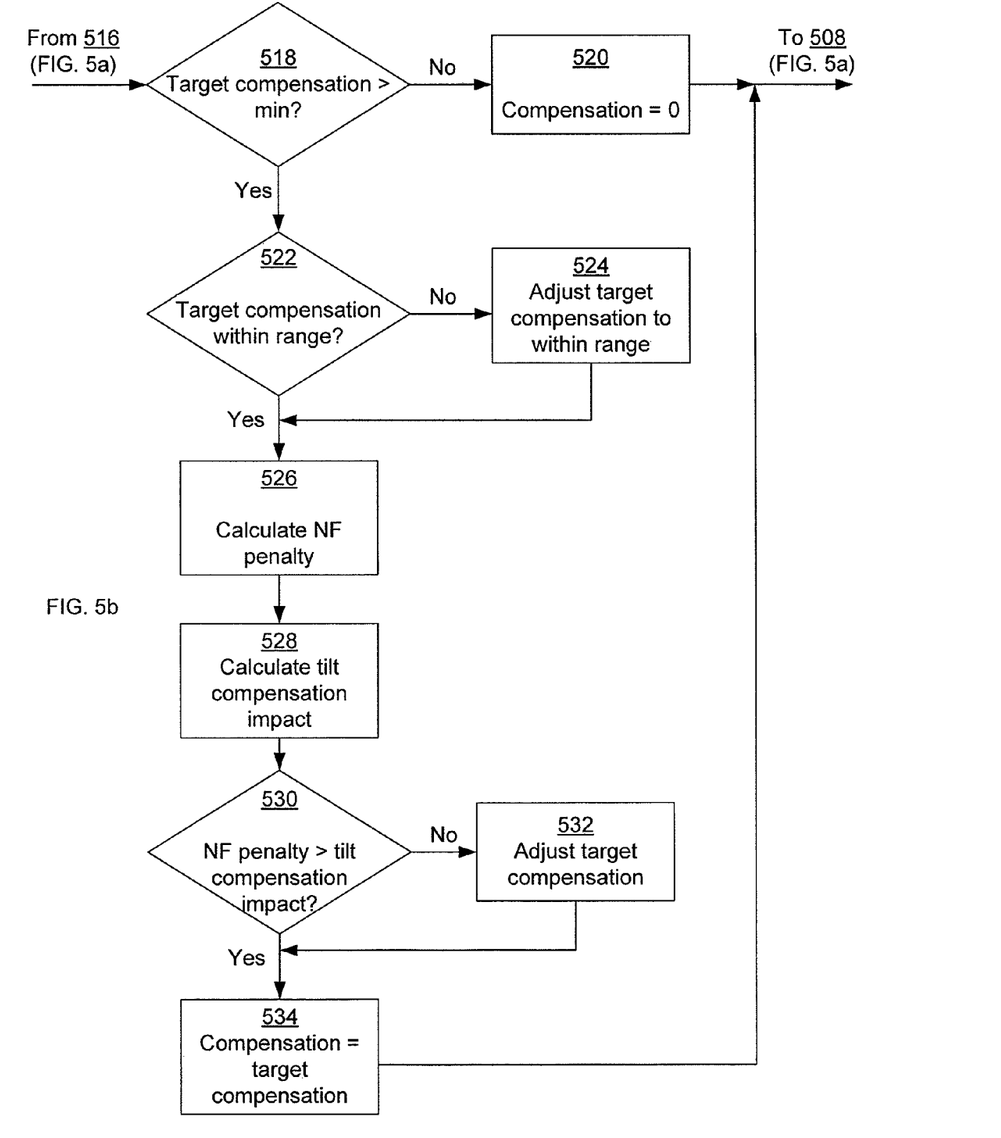
FIG. 5b illustrates an exemplary flow chart for gain tilt compensation in accordance with an embodiment of the invention.

FIGS. 5a and 5b together illustrate an exemplary flow chart for gain tilt compensation in accordance with an embodiment of the invention. Referring to FIGS. 5a and 5b, block 500 shows start of a gain tilt compensation process. Block 502 shows that gain tilt compensation is set to an initial value of zero. The gain tilt compensation may take place at network elements such as, for example, the optical amplifier elements 114, 116, and 200. Block 504 shows that a determination may be made whether power gain needed is above a minimum threshold gain level. The determination may be made, for example, by the controller block 214. If the power gain needed is below the threshold, then the compensation may be set to zero, as shown in block 506, and this compensation may be applied to the relevant amplifier as shown in block 508.

After a period of time for the next iteration of gain tilt compensation, the determination may be made again as shown in block 504 whether the power gain is above the threshold gain level. The gain tilt compensation period may be implementation dependent and may be, for example, a default time that may be changed by the network manager (not shown). Similarly, the network manager may determine the power gain for each network element, where the power gain is a constant gain applied to all wavelengths. The gain tilt compensation period and the power gain may be considered to be, for practical purposes, static in that the network manager may seldom change those values. However, various embodiments of the invention may be used regardless of the gain tilt compensation period and/or power gain changes.

If the power gain needed is above the threshold gain level, then, as shown in block 510, power levels may be measured, by, for example, the power measurement block 212 at each wavelength supported by the network element. Block 512 shows that the controller block 214 may receive the power levels from the power measurement block 212 and determine a gain tilt slope. Calculation of the gain tilt slope may be design dependent. For example, linear fit function as shown by line 320 may be used for the gain tilt slope.

Block 514 shows that a gain tilt error may be compensated by, for example, the controller block 214. The gain tilt slope, as discussed in block 512, may have been calculated using a subset of the number of wavelengths supported by the optical amplifier element 200. Accordingly, the gain slope may need to be extrapolated for end wavelengths that may not be used for carrying information at this time. The extrapolation may provide a gain tilt error for all of the wavelengths supported by the optical amplifier element 200. The gain tilt error may then be the difference in power levels between the smallest wavelength and the largest wavelength supported by the optical amplifier element 200.

Block 516 shows that the calculated gain tilt error may be added to the current gain tilt compensation to yield a target gain tilt compensation. If the current gain tilt compensation is zero (the default value), then the target gain tilt compensation is equal to the calculated gain tilt error. The current gain tilt compensation may be non-zero if this is not a first iteration of gain tilt compensation.

Block 518 (FIG. 5b) shows that the controller block, for example, may determine whether the target gain tilt compensation is greater than a threshold target gain tilt compensation. If not, then gain tilt compensation is set to zero as shown in block 520, and this gain tilt compensation is applied as shown in block 508 (FIG. 5a). If the target gain tilt compensation is greater than a threshold target gain compensation, then a check is made whether the target gain tilt compensation is within an acceptable range, as shown in block 522. If the target gain tilt compensation is beyond the minimum or maximum gain tilt compensation allowed by an amplifier device, such as the amplifier block 210, then the target gain tilt compensation may be set to the minimum or maximum gain tilt, as appropriate, by, for example, the controller block 214, as shown in block 524.

Block 526 shows that the calculated gain tilt may be used to determine the noise figure penalty. This may be done, for example, by the controller block 214 applying a pre-determined calculation to the gain tilt, where the pre-determined calculation may be design dependent. For example, the pre-determined calculation of the noise figure penalty may comprise dividing the gain tilt by two.

Block 528 shows that a tilt compensation impact may be determined. The tilt compensation impact may be based on a lookup table for the noise figure impact where the lookup table may map each of a plurality of gain ranges to a noise figure impact. The controller block 214 may also use, for example, an equation that describes the gain-noise figure impact curve as described with respect to FIG. 4 to determine the noise figure impact. The tilt compensation impact may be calculated, for example, by multiplying the noise figure impact with the gain tilt.

Block 530 shows that the determined noise figure penalty may then be compared to tilt compensation impact. If the tilt compensation impact is greater than the noise figure penalty, the tilt compensation impact may be reduced by reducing the target gain tilt compensation until, for example, the tilt compensation impact is equal to or less than the noise figure penalty, as shown in block 532. When the noise figure penalty is greater than the tilt compensation impact, the gain tilt compensation may be set to the value of the target gain tilt compensation, as shown in block 534. This gain tilt compensation may be applied to correct gain tilt, as shown in block 508.

In the foregoing description, example aspects of the invention are described with reference to specific example embodiments. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of example aspects described herein may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, magneto-optical disks, and semiconductor devices such as FLASH memory, or other types of media/machine-readable medium suitable for storing or transmitting electronic instructions.

The techniques described herein are not limited to any particular software configuration. They may find applicability in any computing or processing environment. The terms "machine accessible medium", "machine readable medium", or "memory" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result. In other embodiments, functions performed by software can instead be performed by hardcoded modules, and thus the invention is not limited only for use with stored software programs. Indeed, the numbered parts of the above-identified procedures represented in the drawings may be representative of operations performed by one or more respective modules, wherein each module may include software, hardware, or a combination thereof.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

In addition, it is not necessary that the procedures performed by the analysts be done with a computer, and instead they can be performed by a human operator.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed:

1. A network element comprising:
an amplifier block configured to amplify one or more received wavelengths;
a power measurement block configured to provide power measurement for each of a plurality of the received wavelengths amplified by the amplifier block; and
a controller block configured to communicate control and status signals with the amplifier block and the power measurement block, wherein
the controller block is configured to determine a gain tilt based on a plurality of the power measurements from the power measurement block,
the controller block is configured to determine a noise figure penalty based on the gain tilt,
the controller block is configured to determine a gain tilt compensation to compensate for the gain tilt taking into account the noise figure penalty, and the controller block is configured to communicate the gain tilt compensation to the amplifier block to be applied to subsequently received wavelengths.

2. The network element of claim 1, wherein if the gain tilt is less than a minimum threshold value, the controller block sets the gain tilt compensation to zero, and that gain tilt compensation is communicated to the amplifier block.

3. The network element of claim 1, wherein the controller block is configured to determine the gain tilt slope using a linear fit method for the power measurements provided by the power measurement block.

4. The network element of claim 3, wherein the controller block is configured to extrapolate, as needed, the gain tilt for all wavelengths supported by the amplifier block.

5. The network element of claim 1, wherein the noise figure penalty is one-half of the gain tilt.

6. The network element of claim 1, wherein a default for the gain tilt compensation is zero.

7. The network element of claim 1, wherein the controller block is configured to set the gain tilt compensation to zero and communicate that gain tilt compensation to the amplifier block, if power gain is less than a minimum threshold gain, wherein the power gain is a constant gain applied to the received wavelengths.

8. The network element of claim 1, wherein the gain tilt compensation is the sum of the gain tilt compensation from a previous iteration and a gain tilt error calculated in a current iteration.

9. The network element of claim 1, wherein the controller block is configured to adjust the gain tilt compensation if the noise figure penalty is less than a tilt compensation impact, wherein the tilt compensation impact is the noise figure impact per unit of gain tilt compensation multiplied by the gain tilt compensation, and the noise figure impact is a characteristic of an amplifier device in the amplifier block.

10. The network element of claim 9, wherein the noise figure impact is calculated using an equation that describes noise figure impact as a function of gain.

11. The network element of claim 9, wherein the noise figure impact is determined using a lookup table.

12. The network element of claim 1, wherein if the gain tilt compensation noise figure impact is larger than the noise figure penalty, the gain tilt compensation is adjusted such that the noise figure impact is less than or equal to the noise figure penalty.

13. A method comprising:
amplifying by an amplifier one or more received wavelengths;
determining a power measurement for each of a plurality of the amplified wavelengths;
determining a gain tilt based on a plurality of the power measurements;
determining a noise figure penalty based on the gain tilt;
determining a gain tilt compensation to compensate for the gain tilt taking into account the noise figure penalty; and
adjusting a gain of the amplifier by the gain tilt compensation.

14. The method of claim 13, comprising setting the gain tilt compensation to zero if the gain tilt is less than a minimum threshold value, and using that gain tilt compensation to adjust the gain of the amplifier.

15. The method of claim 13, wherein a slope of the gain tilt is determined using a linear fit method for the power measurements.

16. The method of claim 15, comprising extrapolating the gain tilt for all wavelengths supported by the amplifier.

17. The method of claim 13, wherein the noise figure penalty is one-half of the gain tilt.

18. The method of claim 13, wherein a default value for the gain tilt compensation is zero.

19. The method of claim 13, comprising setting the gain tilt compensation to zero if power gain is less than a minimum threshold gain, wherein the power gain is a constant gain applied to the one or more received wavelengths.

20. The method of claim 13, wherein the gain tilt compensation is the sum of the gain tilt compensation from a previous iteration and a gain tilt error calculated in a current iteration.

21. The method of claim 13, comprising adjusting the gain tilt compensation if the noise figure penalty is less than a tilt compensation impact, wherein the tilt compensation impact is the noise figure impact per unit of gain tilt compensation multiplied by the gain tilt compensation, and the noise figure impact is a characteristic of an amplifier device in the amplifier block.

22. The method of claim 21, comprising calculating the noise figure impact using an equation that describes noise figure impact as a function of gain.

23. The method of claim 21, using a lookup table to determine the noise figure impact.

24. The method of claim 13, adjusting the gain tilt compensation, if the gain tilt compensation noise figure impact is larger than the noise figure penalty, such that the noise figure impact is less than or equal to the noise figure penalty.

* * * * *